Aug. 17, 1954    R. T. K. CORNWELL    2,686,725
CASING FOR STUFFED PRODUCTS

Filed Feb. 27, 1952    2 Sheets-Sheet 1

INVENTOR.
RALPH T. K. CORNWELL
BY
Thomas B. O'Nally
ATTORNEY.

INVENTOR.
RALPH T. K. CORNWELL
BY
Thomas B O'Malley
ATTORNEY.

Patented Aug. 17, 1954

2,686,725

UNITED STATES PATENT OFFICE 2,686,725

CASING FOR STUFFED PRODUCTS

Ralph T. K. Cornwell, Rosemont, Pa., assignor to American Viscose Corporation, Philadelphia, Pa., a corporation of Delaware Application February 27, 1952, Serial No. 273,683

5 Claims. (Cl. 99—176)

This invention relates to casings for stuffed food products such as sausages.

Seamed casings for stuffed food products may be formed from a sheet material the edges of which are overlapped and autogenously sealed due to the tackiness of the edges after treatment thereof with a solvent for the sheet material. For example, the overlapped edges of a film of an alkali-soluble cellulose ether may be treated with an alkaline solution, e. g., aqueous sodium hydroxide, whereby the treated portions of the film are rendered tacky or adhesive and readily sealed under pressure, the alkali being thereafter neutralized by treating the casings with an acidic medium. While useful casings may be made by this procedure, it has the disadvantage of requiring the use of both alkaline and acid solutions, and complicates the production of the stuffed products.

The seam of a casing for sausage meat and other foodstuffs must be strong and tough, and the casing must not burst at the seam when the food product is exposed to moisture and handled by mechanical devices in the course of inspection, weighing, packaging, and so forth, or when it is handled in the retail markets.

Seamed casings for the stated purpose comprising a sheet of hydrophilic cellulosic material having its longitudinal marginal areas overlapped and heat-sealed by means of a polyethylene disposed between said areas would be very desirable from the commercial viewpoint because of the pronounced hydrophobicity and toughness of the polyethylene resins. However, the adhesion of the polyethylenes to a hydrophilic cellulosic base is extremely poor. For instance, when polyethylene in the molten state or as a preformed film is deposited on a sheet of cellophane which is then pressed and cooled (if molten polyethylene is used) or pressed and heated (if preformed polyethylene film is used) the polyethylene is not permanently bonded to the cellophane and is separated from it without difficulty by a light pulling force. The adhesion of polyethylene to cellophane is so poor that cellophane carrying a polyethylene film can be used in transfer coating, the polyethylene being placed in contact with another base to which it is to be transferred by heat, and the cellophane being easily stripped off leaving the polyethylene in contact with the other base. Also, the polyethylene film can be easily stripped from the cellophane and used as a self-supporting film.

Obviously, this inability of polyethylene to adhere tenaciously to a cellulosic sheet is a major obstacle to their conjoint use in a commercially feasible casing.

The adhesion of polyethylene to paper and textile fabrics comprising hydrophilic cellulosic fibers is also very poor.

It is an object of the present invention to provide a seamed casing for stuffed food products and the like having an improved seal and comprising a sheet of hydrophilic cellulosic material the longitudinal marginal areas of which are overlapped and united by a polyethylene disposed between them. Other objects and advantages of the invention will be apparent from the following discussion.

The casing of the invention comprises hydrophilic cellulosic sheet material, non-fibrous or fibrous, having associated therewith a thermoset resin, the longitudinal marginal areas of the sheet being overlapped and having disposed therebetween a polyethylene which is firmly bonded or adhered to the sheet material by the thermoset resin, whereby the overlapped edges of the sheet are tightly sealed through the polyethylene and do not separate when the casing is exposed to moisture or the mechanical forces and possible cooking operations to which the casings are normally subjected during and after stuffing.

There is thus provided a casing having a superior seal but also having all the advantages of a casing comprising a hydrophilic cellulosic sheet material; i. e., it is water-permeable but greaseproof; it permits the passage of air and moisture vapor while preventing loss of grease and fat and thus facilitates the formation of a "skin" of coagulated protein material on the surface of the meat; it is capable, during stuffing and cooking operations, of shrinking or expanding sufficiently to conform with the changing size and shape of the sausage without wrinkling and it does not adhere to the meat.

The hydrophilic cellulosic sheet may be a paper formed from or comprising cellulosic fibers and of such thickness and flexibility that it can be readily formed into a tubular casing, or it may be a textile fabric, knitted or woven, comprising, for example, regenerated cellulose fibers or yarns. In the preferred embodiment however, the sheet is a non-fibrous pellicle produced from any suitable water-insoluble hydrophilic film-forming cellulosic material, such as regenerated cellulose whether formed from viscose solutions, cuprammonium cellulose solutions or solutions of cellulose in organic or inorganic solvents, or it may be a non-fibrous pellicle comprising a cellulose ether which is insoluble in but swollen by water, such as, for instance, the alkali-soluble water-insoluble cellulose ethers including hydroxyalkyl ethers, carboxyalkyl ethers and mixed cellulose ethers of this class, cellulose ether xanthates, cellulose xantho-ethers, cellulose thiourethanes and cellulose xantho-fatty acids.

The thermoset resin which is associated with the cellulosic sheet may be a melamine-formaldehyde, urea-formaldehyde, ketone-formaldehyde or phenol formaldehyde resin the partial condensates of which are water-soluble. Mixture of these resins may be used. In general, those thermosetting resins the pre-condensates of which are water-soluble and which have been recommended for use with paper to improve its wet strength are satisfactory.

In preparing the casing, the hydrophilic cellulosic sheet is treated with an aqueous solution of the thermosetting resin-forming constituents in unreacted or partially condensed condition and the treated sheet is heated to drive off the water and convert the resin to the fully condensed thermoset state in situ in the sheet. In the preferred embodiment, the cellulosic sheet is treated with an aged, acidic aqueous colloidal solution containing from about 0.5 to 20% by weight of a partially polymerized melamine-formaldehyde condensation product which is in a state of polymerization less than that characterizing a gel, said solution being water-dilutable, colloidal in nature, and having positively charged hydrophilic particles of less than about one micron in diameter.

While the treatment with the aqueous solution of the thermosetting resin precondensate may be restricted to the portions or areas of the sheet adjacent the opposite edges thereof which are to be overlapped to form the seam, it may be more convenient to simply run the sheet through the aqueous colloidal solution of the partial condensate in which case the thermoset resin is substantially uniformly distributed in or on the final sheet. This has the advantage that if it is desired to apply a moisture-proofing coating to the surface of the sheet which will constitute the outer wall of the shaped casing, the thermosetting resin functions to anchor the coating to the sheet. A moistureproofing coating may be applied to all portions of the sheet surface except the portions adjacent the edges, or if it is applied to the entire surface it may be removed from the edge portions which are to be overlapped and sealed by applying a solvent for the moistureproofing coating to the edge portions and removing the dissolved coating by means of a wiper roll. Care should be taken that the solvent, if used, does not affect the thermoset resin associated with the sheet.

In the preferred embodiment, the hydrophilic cellulosic sheet is a non-fibrous pellicle such as is obtained by extruding a cellulosic film-forming material into an appropriate bath, and the pellicle is treated with the aqueous acidic solution of the partial melamine-formaldehyde condensate in the course of its production. For example, the wet regenerated cellulose gel obtained by extruding viscose into a coagulating and regenerating bath through a suitable film-forming device and subjecting it to the usual after-treating liquids may be treated with the aged, aqueous acidic colloidal solution of the melamine-formaldehyde precondensate, suitably diluted, prior to passing the film through the usual aqueous bath containing a softening agent or plasticizer. Since regenerated cellulose normally carries a negative electrical charge, the positively charged resin particles in the dispersion are absorbed by the cellulose gel. After heating and washing the pellicle, it is treated with the aqueous medium containing the plasticizer (which may be glycerol, ethylene glycol, sorbitol, ethanolamine lactate, ammonium sulfamate, or another equivalent hygroscopic substance), washed and dried. In the final, dried pellicle the melamine-formaldehyde resin exists in the condensed thermoset state. The softening or plasticizing bath may also contain the partially condense melamine-formaldehyde resin, or the resin may be applied after the softening bath.

Film-forming polyethylenes, such as a polyethylene having a molecular weight between 10,000 and 38,000 and a softening point between 100 and 108° C., may be used in practicing the invention. The polyethylene may be used in the molten condition or in the form of a filament, strand or strip, or it may be applied from a suitable volatile solvent therefor, if desired. A polyethylene strip of the desired width, for example a strip having a width of $\frac{1}{32}$ of an inch to $\frac{1}{16}''$, is interposed between the edges of the sheet immediately before the casing seam is formed, and the seam is subjected to heat and pressure to seal the edges of the sheet to the polyethylene strip and to each other through the strip.

In the preferred embodiment the casing is formed from a film or sheet of regenerated cellulose from viscose at least the longitudinal marginal areas of which have associated therewith the specific thermoset melamine-formaldehyde resin described herein, those areas being overlapped and bonded to polyethylene applied in molten condition and to each other through the polyethylene. Because the melamine-formaldehyde apparently has a pronounced "affinity" for both the regenerated cellulose of the sheet and polyethylene, regenerated cellulose and polyethylene can be used conjointly in a seamed casing and full advantage is taken of the outstanding value of polyethylene as a sealing medium despite the lack of affinity which normally exists between regenerated cellulose and polyethylene. The tenacious adherence of the polyethylene to the thermoset melamine-formaldehyde resin, taken with the tenacious adherence of the melamine-formaldehyde resin to the regenerated cellulose makes for a casing seam which is especially tough and resistant to rupture.

The operations of forming the casing from the cellulosic sheet material comprising the thermoset resin, disposing the polyethylene between the edges, sealing the edges, and stuffing the casing may be performed continuously and concurrently. Suitable apparatus is shown in the attached drawing in which Figure 1 is a side elevation partly in section of one form of apparatus which may be used;

Figure 1:
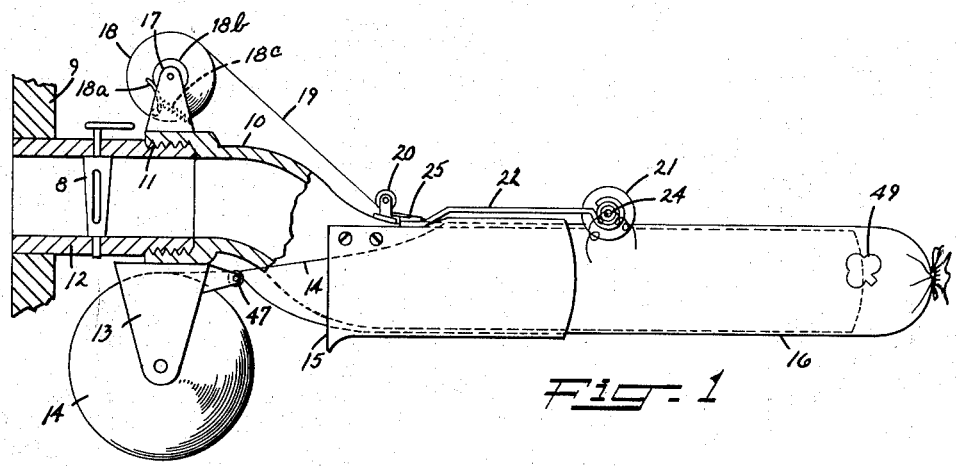
Figure 2:
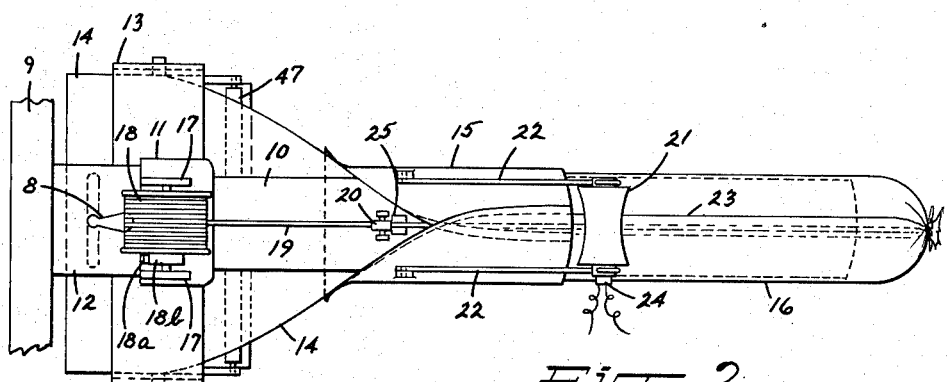
Fig. 2 is a top plan view of the apparatus of Fig. 1

In Figs. 1 and 2 there are shown two views of one embodiment of the apparatus comprising the combination of a nozzle 10 having a threaded end 11 adapted to screw on the outlet pipe 12 of a conventional sausage meat container 9 to replace the nozzle normally used thereon. The meat container 9 is placed under hydraulic pressure as is customary; and valve 8 is adapted and arranged to control the flow of the meat through the nozzle in the usual manner. On the underside of the nozzle 10, there is mounted a bracket 13 adapted to support a roll 14 of thermosetting resin-treated cellulosic sheet material, for example, a roll of regnerated cellulose film having the special melamine-formaldehyde resin described herein associated with it. On each side of the nozzle 10 there is mounted a tube-former 15 which encircles the nozzle and is arranged to shape the sheet material into a tubing 16 about the nozzle. A bracket 17 is also provided for rotatably supporting a supply spool 18 having a polyethylene strip wound thereon. The bracket may be supported in any fashion, either directly on the nozzle or separate therefrom. A drag or brake shoe 18a is urged by a spring 18c against a drum 18b secured to the spool shaft in order to properly tension the polyethylene strip 19 during its withdrawal from the supply roll. A guide or pulley 20 for the strip 19 is mounted on the nozzle 10 in line with the overlapped edges of the sheet within the former 15. A hollow arcuate roller 21 supported on a forked spring 22 is positioned to apply pressure to the seam 23 and is provided with heating means such as any form of electrical heating coil or lamp, e. g., an infrared ray lamp 24. Also, if desired, means may be provided to heat the strip 19 just before it is laid between the overlapped edges of the thermosetting resin-treated cellulosic sheet being formed into a tube. For example, a heating element 25 may be secured in, on, or above the nozzle 10 in advance of the roll 21 so that the polyethylene strip 19 passes in contact with the heating element 25 or sufficiently close to it so that its surface is heated to an adhesive condition as it proceeds on its way to form the longitudinal seam 23. After the sealed tubing 16 passes beyond the end of nozzle 10, it is tied and then filled with sausage meat. If desired, the stuffed casing may be twisted at intervals to provide sausage links.

Figure 3:
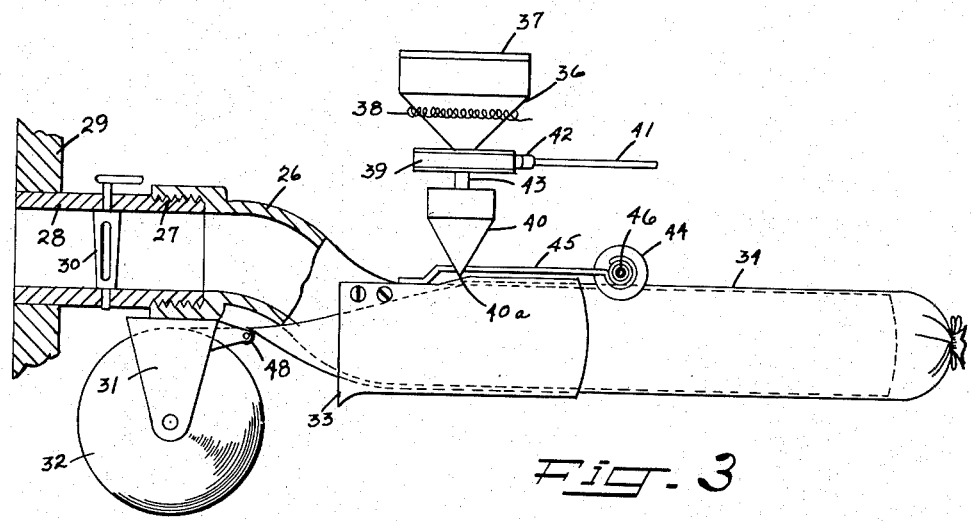
Fig. 3 is a side elevation, partly in section, of another embodiment.
Figure 4:
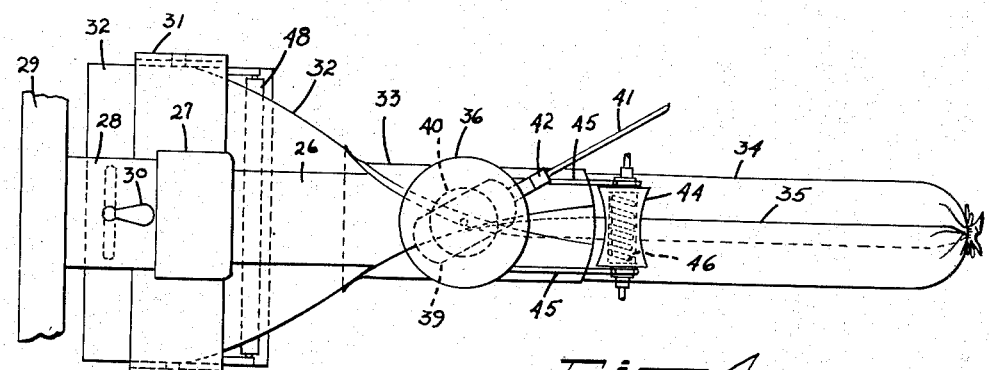
Fig. 4 is a top plan view of the apparatus of Fig. 3.

The preferred embodiment illustrated in Figs. 3-4 is designed to permit deposition of molten polyethylene on a marginal area of the thermosetting resin-treated cellulosic sheet. The apparatus comprises the combination of the nozzle 26 having a threaded end 27 adapted to screw on the outlet pipe 28 of a conventional sausage meat container 29 to replace the nozzle generally used thereon. Valve 30 is adapted and arranged to control the flow of the meat through the nozzle. Bracket 31 is mounted on the underside of the nozzle 26 and adapted to support the roll 32 of thermosetting resin-treated cellulosic sheeting. On each side of the nozzle, there is arranged a tube former 33 which encircles the nozzle and is arranged to shape the cellulosic sheet into a tubing 34 about the nozzle. Means for depositing the molten polyethylene on the cellulosic sheet on its way to form a longitudinal seam 35 is detachably mounted on nozzle 26. Said means comprises a hopper 36 which is provided with a lid 37 and has associated therewith a heating coil 38 for maintaining the polyethylene in the molten state. Hopper 36 is connected to a positive displacement pump 39 adapted to feed the molten polyethylene to the extrusion device 40 having downwardly sloped walls terminating in a circular extrusion orifice 40a. Pump 39 is driven by the drive shaft 41 which is adapted to be positively connected to the pump mechanism by coupling 42. The extrusion device 40 is connected to pump 39 by conduit 43. The extrusion orifice 40a may have any suitable diameter, for example from $\frac{1}{32}''$ to $\frac{1}{16}''$ and the width and thickness of the polyethylene stream deposited on the sheet may be controlled by controlling the speed of pump 39 relative to the rate of travel of the cellulosic sheet past the extrusion device. Or the pump may be omitted, if desired, the polyethylene being deposited on the sheet by gravitational flow. The arcuate roller 44 supported on forked spring 45 is positioned to apply pressure to the seam 35. The roller 44 may be hollow and may be provided with cooling means, for example a coil 46 through which a cooling medium is circulated for toughening the polyethylene simultaneously with the application of pressure to the seam. If desired, a pair of rollers may be provided, the sheet carrying the polyethylene being fed between them. After the sealed tubing 34 passes beyond the end of nozzle 26 it is tied and filled with sausage meat.

It is desirable to feed the thermosetting resin-treated cellulosic sheet in such a position that the center and edges of the sheet are displaced an equal distance from the longitudinal axis of the nozzle. This is done by forming the nozzle 10 (Figs. 1-2) or 26 (Figs. 3-4) with a reverse curve at the end adjacent to the meat container, and there is provided a guide roller (47—Figs. 1-2, 48—Figs. 3-4) so positioned that the upper surface of the roller lies in the same plane with the axis of the free end of the nozzle. When the cellulosic sheet material is passed from the supply roll over the guide roll to the tube-former it is approximately at the same level as the center of the nozzle and is suitably positioned for the formation of the tubing. It is to be understood that in the embodiment of Figs. 1-2, the nozzle may be reversed so that the supply roll from which the thermosetting resin-treated sheet is drawn is supported on the top side of the nozzle while the means for applying the polyethylene strip is on the underside, in which case the seal will be formed on the underside of the nozzle.

The following examples in which parts are by weight unless otherwise indicated illustrates specific embodiments of the invention.

*Example I*

Three moles of melamine were mixed with 10 moles of formaldehyde (30% formalin) to give a solution having a pH of 9.0. The solution was heated for thirty minutes, cooled, and the resulting crystalline condensate was separated and dried. Fifty parts by weight of the condensate were dissolved in an aqueous solution containing 27.6 parts of 18° Bé. hydrochloric acid and 125 parts of water, thus giving a solution containing 25% by weight of the condensate. The solution was diluted to 14% by weight of the condensate and allowed to age at room temperature for 24 to 28 hours. A bluish haze developed and the solution then exhibited the Tyndall effect thus indicating that the condensate particles had a diameter between 0.1 and 1.0 micron. The particles migrated toward the cathode when a direct current was passed through the solution.

A sheet of washed regenerated cellulose in the wet gel state was passed through a solution obtained by diluting the melamine-formaldehyde condensate solution prepared as above to a condensate content of 3%. In the contact time of 20 seconds, sufficient condensate solution penetrated the film to give a concentration in the film of about 1% by weight of condensate.

The impregnated pellicle was passed through squeeze rolls to remove excess solution, heated, washed, and then passed into a plasticizing bath containing 3.5% to 4% of glycerine. The pellicle was dried in the usual manner.

The pellicle was then formed into a casing, using apparatus as shown in Figs. 1-2 of the drawing, a strip of heat-softened polyethylene having a molecular weight of about 12,000 and a softening point of about 104° C. being laid down between the overlapped edges.

*Example II*

A regenerated cellulose pellicle obtained as in Example I was formed into a casing using the appartus of Figs. 3-5. Molten resinous polyethylene having a molecular weight of about 19,000 and a softening point of 108° C. was extruded downwardly onto one edge of the pellicle as the latter passed under the orifice in the extruding device 40.

Instead of depositing the polyethylene on the thermo-setting resin-treated cellulosic sheet in molten condition or as a preformed strip, the polyethylene may be in the form of a filament or a bundle of filaments in the form of a yarn, thread or the like twisted or untwisted strand.

The cellulosic sheet material comprising the thermoset melamine-formaldehyde resin may be preprinted before it is formed into the tubing. The printing may be applied to a roll of full mill width and the printed roll then slit into strips of the width required to form casings, thus affording a considerable saving in cost. For example, the seamed casing may bear indicia such as shown at 49 in Fig. 1. When the printing is to occur on the outside of the casing any conventional ink which will adhere to the sheet during the operations of stuffing and cooking, and which is resistant to grease and water, may be used or the cellulosic sheet may be preprinted and formed into a casing having the printed matter located on its inner surface and viewed through the transparent casing. Since the sheet comprises a hydrophilic cellulosic material which is non-thermoplastic and a thermoset resin, it does not adhere to the sausage meat or the like, and can be stripped off to provide so-called "skinless" sausages. When such skinless sausages are to be produced, it may be desirable, in printing the sheet material, to employ an improved fat-soluble food dye which occurs on the inner surface of the casing and is transferred to the surface of the meat stuffed in the casing so that the meat will bear the printing after the casing has been striped from the sausage. There may thus be provided a "skinless" sausage bearing a printed identifying legend or the like.

In some instances it may be desirable to pre-wet the sheet material before the casing is stuffed. The shrinking which the wet tubing undergoes on drying is desirable in packing certain meat products containing water and insures contraction of the casing with the meat product, thereby insuring a tight-fitting casing. If it is desired to pre-wet the sheet using the apparatus illustrated in the drawing, the supply roll carrying the continuous sheeting may be partially immersed in water (which does not affect the thermoset resin), or the sheet may be passed through a water bath or under or between jets which project water onto its surface or surfaces before the sheet is formed into the tube.

If it is desired to provide the seamed casing with a tear strip or cord, a narrow strip or thread of a material which is not rendered tacky by heat may be fed concurrently with the polyethylene strip so that the tear strip or tear cord is located at the seam.

Although the invention has been described in detail in connection with casings for sausage, it is not limited thereto. The casing having the improved seal may be used for encasing substances of any plastic material, such as ice cream, fats, scrapple and other meat products as well as lard, oleomargarine, greases, caulking compounds, etc.

The strip of polyethylene 19 (Figs. 1-2) or the stream of polyethylene issuing from the orifice of the extruding device 40 (Figs. 3-4) may be deposited on the sheet material in such a way that the seam is approximately equal to the extent of overlapping of the marginal areas of the sheet material, but in making stuffed products from which the skin is to be ultimately stripped, the polyethylene strip or stream may be and preferably is deposited on the sheet in such manner that the seal is narrower than the overlapping, leaving an exposed edge or margin of the outer lap unadhered. This unadhered edge may be seized by hand or machine to facilitate stripping of the skin or casing from the sausage.

Various changes and modifications may be made in the details given herein without departing from the spirit and scope of the invention. It will be understood, therefore, that the invention is not to be limited except as defined in the appended claims.

I claim:

1. A casing comprising hydrophilic cellulosic sheet material, the longitudinal marginal portions of which have in at least one surface of said portions a thermosetting resin in the thermoset state, said surfaces of at least two of said portions being overlapped and having a solid resinous polyethylene disposed between them, the overlapped portions being firmly adhered to each other through the thermosetting resin and the polyethylene.

2. An article of manufacture as in claim 1 in which the thermoset resin is a melamine-formaldehyde resin.

3. An article of manufacture as in claim 1 in which the cellulosic sheet material is a regenerated cellulose film.

4. An article of manufacture as in claim 1 in which the polyethylene has a molecular weight between 10,000 and 38,000 and a softening point between 100° C. and 108° C.

5. An article of manufacture as in claim 1 in which the thermoset resin is a melamine-formaldehyde resin, the cellulosic sheet material is a regenerated cellulose film, and the polyethylene has a molecular weight between 10,000 and 38,000 and a softening point between 100° C. and 108° C.

References Cited in the file of this patent

UNITED STATES PATENTS

| Number | Name | Date |
|---|---|---|
| 2,346,417 | Cornwell et al. | Apr. 11, 1944 |
| 2,604,244 | Tripp | July 22, 1952 |
| 2,607,696 | Kunz | Aug. 19, 1952 |

FOREIGN PATENTS

| Number | Country | Date |
|---|---|---|
| 601,713 | Great Britain | May 11, 1948 |
| 601,715 | Great Britain | May 11, 1948 |